(12) United States Patent
Wilson

(10) Patent No.: US 7,452,852 B2
(45) Date of Patent: Nov. 18, 2008

(54) WATER-BASED PAINT-REMOVING SOLUTION

(75) Inventor: Neil R. Wilson, Lake Orion, MI (US)

(73) Assignee: Henkel KGaA (DE)

( * ) Notice: Subject to any disclaimer, the term of this patent is extended or adjusted under 35 U.S.C. 154(b) by 401 days.

(21) Appl. No.: 11/088,466

(22) Filed: Mar. 24, 2005

(65) Prior Publication Data
US 2005/0187119 A1 Aug. 25, 2005

Related U.S. Application Data

(62) Division of application No. 10/027,445, filed on Dec. 20, 2001, now Pat. No. 6,887,837.

(60) Provisional application No. 60/259,667, filed on Jan. 4, 2001.

(51) Int. Cl.
C11D 7/50 (2006.01)

(52) U.S. Cl. .................. 510/201; 134/38; 510/212

(58) Field of Classification Search .......... 510/201, 510/212; 134/38
See application file for complete search history.

(56) References Cited

U.S. PATENT DOCUMENTS

| | | | | |
|---|---|---|---|---|
| 2,710,843 A | 6/1955 | Stebetpm | .................. | 252/158 |
| 2,951,043 A | 8/1960 | Blank | .................. | 252/171 |
| 2,971,919 A | 2/1961 | Goldsmith | .................. | 252/139 |
| 3,048,547 A | 8/1962 | Vosbigian | .................. | 252/102 |
| 3,553,144 A | 1/1971 | Murphy | .................. | 252/158 |
| 3,615,827 A | 10/1971 | Murphy | .................. | 252/127 |
| 3,681,250 A | 8/1972 | Murphy | .................. | 252/158 |
| 3,847,839 A | 11/1974 | Murphy et al. | .................. | 252/544 |
| 4,090,001 A | 5/1978 | Mertzweiller nee Maillard et al. | .................. | 427/444 |
| 4,294,617 A | 10/1981 | Schlicklin et al. | .................. | 106/14.37 |
| 4,537,705 A | 8/1985 | Mahoney et al. | .................. | 252/529 |
| 4,619,706 A | 10/1986 | Squires et al. | .................. | 134/2 |
| 4,673,524 A | 6/1987 | Dean | .................. | 252/118 |
| 4,770,713 A | 9/1988 | Ward | .................. | 134/38 |
| 5,006,279 A | 4/1991 | Grobbel et al. | .................. | 252/542 |
| 5,279,760 A | 1/1994 | Sato et al. | .................. | 510/185 |
| 5,391,234 A * | 2/1995 | Murphy | .................. | 134/38 |
| 5,411,678 A | 5/1995 | Sim | .................. | 252/548 |
| 5,454,985 A | 10/1995 | Harbin | .................. | 252/558 |
| 5,536,539 A | 7/1996 | Harbin | .................. | 510/212 |
| 5,591,702 A | 1/1997 | Murphy | .................. | 252/158 |
| 5,632,822 A | 5/1997 | Knipe, Jr. et al. | .................. | 134/22.12 |
| 5,701,922 A | 12/1997 | Knipe, Jr. et al. | .................. | 134/100.1 |
| 5,721,204 A | 2/1998 | Maxwell et al. | .................. | 510/206 |
| 5,759,975 A | 6/1998 | Maxwell | .................. | 510/203 |
| 5,854,190 A | 12/1998 | Knipe, Jr. et al. | .................. | 510/241 |
| 5,954,891 A | 9/1999 | Kondoh et al. | .................. | 134/40 |
| 5,972,865 A | 10/1999 | Knipe, Jr. et al. | .................. | 510/212 |
| 5,990,062 A | 11/1999 | Summerfield et al. | .................. | 510/204 |
| 6,200,940 B1 | 3/2001 | Vitomir | .................. | 510/206 |
| 6,241,912 B1 | 6/2001 | Kitano et al. | .................. | 252/408.1 |
| 6,303,552 B1 | 10/2001 | Vitomir | .................. | 510/202 |

* cited by examiner

*Primary Examiner*—Gregory E Webb
(74) *Attorney, Agent, or Firm*—Mary K. Cameron

(57) ABSTRACT

Paint residues may be removed from spraying equipment and the like by flushing with aqueous compositions containing alkoxylated aromatic alcohols wherein the aromatic ring moieties of such alcohols do not bear any alkyl substituent containing more than 4 carbon atoms. Preferably, the aqueous compositions also contain an alkanolamine or other base. The alkoxylated aromatic alcohols contain an average of at least about 2 oxyalkylene moieties (preferably, oxyethylene moieties) per molecule.

18 Claims, No Drawings

WATER-BASED PAINT-REMOVING SOLUTION

CROSS-REFERENCE TO RELATED APPLICATIONS

This application is a divisional of SN: 10/027,445 filed Dec. 20, 2001 now U.S. Pat No. 6,887,837, which claims priority to provisional application Ser. No. 60/259,667, filed Jan. 4, 2001, incorporated herein by reference in its entirety.

BACKGROUND OF THE INVENTION

This invention relates to cleaning paint, whether fresh, dried, and/or aged, from surfaces where such paint is not desired. More particularly, this invention relates to cleaning paint from paint spraying equipment, to a novel water-based solution for accomplishing such cleaning, and to a concentrate from which the solution can be made by dilution with water only.

Current commercial practice in the art preponderantly utilizes solutions that comprise a component of amines and a component of organic solvent generally selected from the group consisting of simple alcohols and monoethers of glycols, most or all with molecules that contain no more than eight carbon atoms, in order to have sufficient water solubility. The amines used are typically alkanolamines like dimethyl ethanol amine, methyl isopropanol amine, and diethanol amine but are not limited to this class of amines. Typical solvents used in the solution are alcohols and glycol ethers, such as n-butanol, ethylene glycol mono butyl ether, diethylene glycol n-butyl ether, triethylene glycol methyl ether, propylene glycol normal butyl ether, dipropylene glycol methyl ether, propylene glycol methyl ether, and propylene glycol normal propyl ether. Typical concentrate formulas consist of 85 to 99% of solvent and 1 to 15% of alkanolamine, with the balance water. The concentrates are usually diluted to from 5% to 15%, by weight or volume, in deionized water for use as a working water-based paint-removing solution. Operating temperature when using the water-based solution is usually from 21 to 55° C.

Many of the constituents of conventional paint removing solutions are legally classified as "volatile organic compounds", hereinafter usually abbreviated as "VOC". A major object of this invention is to provide paint flushing solutions and processes that are as technically satisfactory for paint flushing as current commercial processes but have substantially lower VOC content and/or emissions. Other alternative and/or concurrent objects will become apparent from the description below.

Except in the claims and the operating examples, or where otherwise expressly indicated to the contrary, all numerical quantities in this description indicating amounts of material or conditions of reaction and/or use are to be understood as modified by the word "about" in describing the broadest scope of the invention. Practice within the numerical limits stated is generally preferred, however. Also, throughout the description and claims, unless expressly stated to the contrary: percent, "parts of", and ratio values are by weight; the term "polymer" includes "oligomer", "copolymer", "terpolymer", and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; specification of materials in ionic form implies the presence of sufficient counterions to produce electrical neutrality for the composition as a whole, and any counterions thus implicitly specified preferably are selected from among other constituents explicitly specified in ionic form, to the extent possible; otherwise such counterions may be freely selected, except for avoiding counterions that act adversely to the objects of the invention; the term "paint" and its grammatical variations includes any more specialized types of protective exterior coatings that are also known as, for example, lacquer, electropaint, shellac, top coat, base coat, color coat, and the like; and the term "mole" and its variations may be applied to ionic, chemically unstable neutral, or any other chemical species, whether actual or hypothetical, that is specified by the type(s) of atoms present and the number of each type of atom included in the unit defined, as well as to substances with well defined neutral molecules.

BRIEF SUMMARY OF THE INVENTION

The invention provides a method of cleaning paint from non-water-soluble surfaces, especially metal surfaces, comprising contacting the paint with an aqueous composition comprising a water-soluble alkoxylated aromatic alcohol such as an ethoxylated phenol or an ethoxylated benzyl alcohol which contains an aromatic ring moiety but which does not bear any alkyl substituent having more than 4 carbon atoms. In preferred embodiments, the aqueous composition is additionally comprised of a base such as a water-soluble alkanolamine. The aqueous composition is preferably homogenous and single phase in character.

DETAILED DESCRIPTION OF THE INVENTION AND PREFERRED EMBODIMENTS

The present invention is particularly suitable for use in removing uncured water-borne paint from surfaces and the various embodiments described as preferred herein are preferred with respect to such end-use application. However, the invention is also useful for removing cured water-borne paint as well as solvent-borne paint, although for such applications variations from the embodiments described herein as preferred may be necessary in order to achieve optimum results.

It has been found that aqueous solutions of water-soluble alkoxylated aromatic alcohols containing oxyalkylene moieties such as oxyethylene but which do not have relatively long chain alkyl groups substituted on the aromatic ring are quite effective in removing paint residues from surfaces. Preferably, the alkoxylated aromatic alcohol component of the paint-removing solution contains an average of from about 2 to about 10 oxyethylene, moieties per molecule.

The alkoxylated aromatic alcohol preferably is a non-ionic organic compound comprising, in each molecule:

(1) an aromatic ring moiety, wherein said aromatic ring moiety does not bear any alkyl substituent containing more than 4 carbon atoms; and
(2) a linear moiety that conforms to the immediately following general formula (I):

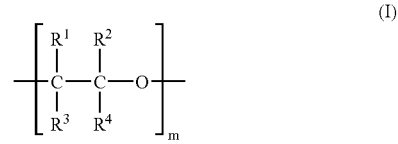

wherein m represents a positive integer of at least 2 and each of $R^1$ through $R^4$, independently for each and independently from one to another of the m instances of each of $R^1$ through $R^4$ in said linear moiety, represents either a covalently bonded hydrogen atom or a covalently bonded methyl moiety. The above-mentioned linear moiety is attached to the aromatic ring moiety, preferably through an ether oxygen alone or through an oxymethylene (—CH$_2$—O—) moiety. The end of the linear moiety which is not attached to the aromatic ring moiety is preferably hydroxyl-terminated (i.e., an OH group is present at one end of the linear moiety).

In one embodiment of the invention the water-soluble alkoxylated aromatic alcohol component is a mixture of compounds corresponding to the general structure.

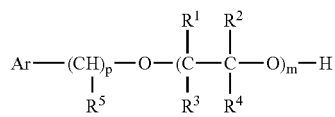

wherein m represents a positive integer which is at least about 2 on average (more preferably, at least about 3 on average) and independently is no more than about 10 on average (more preferably, no more than about 5 on average), each of $R^1$ through $R^4$ independently from one to another of the m instances of each of $R^1$ through $R^4$ in the same molecule, represents either a covalently bonded hydrogen atom or a covalently bonded methyl moiety, subject to the proviso that at least about 70 number % (more preferably, at least 80 number %; most preferably, at least about 90 number % of the moieties) indicated by the symbols $R^1$ through $R^4$ in said mixture represent hydrogen atoms, Ar is a substituted or unsubstituted phenyl moiety ("unsubstituted" meaning that there are no substituents on the phenyl ring other than the oxyalkylene moieties), subject to the proviso that Ar contains no alkyl substituent containing more than 4 carbon atoms (more preferably, Ar contains no alkyl substituent containing more than 2 carbon atoms; most preferably, Ar contains no alkyl substituent containing more than 1 carbon atom), $R^5$ is selected from hydrogen or methyl, and p is 0 or 1.

Representative preferred alkoxylated aromatic alcohols include triethylene glycol monophenyl ether, tetraethylene glycol monophenyl ether, pentaethylene glycol monophenyl ether, hexaethylene glycol monophenyl ether, heptaethylene glycol monophenyl ether, triethylene glycol monobenzyl ether, tetraethylene glycol monobenzyl ether, pentaethylene glycol monobenzyl ether, hexaethylene glycol monobenzyl ether, heptaethylene glycol monobenzyl ether, water-soluble ethoxylates of propylene glycol monophenyl ether (preferably, containing an average of at least 2 oxyethylene moieties per molecule), and the like and mixtures thereof. Suitable alkoxylated aromatic alcohols are available from commercial sources such as Harcross (T Det P4) and Clariant (ST-8329 and Genapol® BA 04).

Non-exclusive examples of suitable ring moieties for part (1) of the alkoxylated aromatic alcohol molecules as described above are the rings of benzene and naphthalene. Any of the positions on these rings may be substituted with halogen or alkyl moieties, and at least one of the positions on these rings must be substituted with a moiety that includes a linear moiety as described in part (2) above. These linear moieties are normally produced by condensing at least one alkylene oxide (e.g., ethylene oxide, propylene oxide) with a suitable compound having at least one active hydrogen (e.g., phenol, benzyl alcohol), as is generally well known in the art. Alkoxylation is preferably carried out under conditions effective to react an average of at least about two (more preferably, at least about three) moles of alkylene oxide per mole of active hydrogen in the aromatic alcohol.

At least for economy, for the alkoxylated aromatic alcohol component the following preferences apply, each independently of the others, with combinations of the preferences being still more preferred, the greater the number of the following preferences that apply simultaneously:

there is only one ring moiety in each molecule;

at least, with increasing preference in the order given, 50, 70, 80, 90, 95, or 99 number % of the ring moieties are phenyl rings, optionally substituted but more preferably unsubstituted, except for any substituent that contains a linear moiety according to general formula (I);

any substituent on a ring moiety, except a substituent that contains a moiety according to general formula (I), contains not more than, with increasing preference in the order given, 4, 3, 2, or 1 carbon atoms and not more than, with increasing preference in the order given, 3, 2, 1, or 0 of any atoms except carbon and hydrogen atoms;

at least, with increasing preference in the order given, 50, 60, 70, 75, 80, 85, 90, 95, or 99 number % of the moieties indicated by the symbols $R^1$ through $R^4$ in general formula (I) represent hydrogen atoms;

the average number of carbon atoms in the shortest path along chemical bonds between a carbon atom that is part of a ring moiety as defined in part (A)(1) above and an oxygen atom that is either bonded directly to a moiety conforming to general formula (I) or is itself part of a moiety conforming to general formula (I) is not more than, with increasing preference in the order given, 10, 8, 6, 4, 3.0, 2.5, 2.0, 1.5, or 1.0;

there is a ratio between the number of carbon atoms in moieties that conform to the general formula —CH$_2$—CH$_2$—O— and the number of all other carbon atoms in the alkoxylated aromatic alcohol component that is at least, with increasing preference in the order given, 0.10:1.00, 0.20:1.00, 0.30:1.00, 0.40:1.00, 0.45:1.00, 0.50:1.00, 0.54:1.00, 0.56:1.00, 0.58:1.00, or 0.60:1.00 and independently preferably is not more than, with increasing preference in the order given, 2.00:1.00, 1.5:1.00, 1.0:1.00, 0.90:1.00, 0.85:1.00, 0.82:1.00, 0.80:1.00, 0.78:1.00, 0.76:1.00, 0.74:1.00, 0.72:1.00, or 0.70:1.00;

where a mixture of alkoxylated aromatic alcohols is used, the number percent of molecules of the mixture for which the value of m in general formula (I) has the value of the nearest integer to the number average value of m for the mixture as a whole is at least, with increasing preference in the order given, 10, 13, 16, 18, 20, or 22% and independently preferably is not more than, with increasing preference in the order given, 75, 60, 50, 40, 35, 30, 28, 26, or 24%;

the number percent of molecules of a mixture of alkoxylated aromatic alcohols for which the value of m in general formula (I) has a value that does not differ by more than 1 from the nearest integer to the number average value of m for the mixture as a whole is at least, with increasing preference in the order given, 30, 35, 40, 45, 50, 54, 57, or 60% and independently preferably is not more than, with increasing preference in the order given, 90, 80, 73, 69, 66, 64, or 62%; and the number percent of molecules of a mixture of alkoxylated aromatic alcohols for which the value of m in general formula (I) has a value that does not differ by more than 2 from the nearest integer to the number average value of m for the mixture as a whole is at least, with increasing preference in the order given, 60, 70, 75, 78, 80, 82, or 84% and independently preferably is not more than, with increasing preference in the order given, 95, 93, 91, 89, 87, or 85%.

In preferred embodiments of the invention, the alkoxylated aromatic alcohol is used in combination with a water-soluble base (i.e., a substance capable of rendering the aqueous composition used as a paint removing solution alkaline). Organic as well as inorganic bases may be employed, although organic bases are generally preferred. Generally speaking, an amount of base is preferably used which is sufficient to provide a pH in the working paint-removing solution of from about 8 to about 14 (more preferably, from about 9.5 to about 11.5).

The base component as described above preferably is an alkanolamine and preferably is selected from alkanolamine molecules that jointly have the following characteristics, each of which is preferred individually and combinations of which are still more preferred, the greater the number of individual preferences in the combination:

the average number of amino nitrogen atoms per molecule is not more than, with increasing preference in the order given, 5, 3, 2.0, 1.8, 1.6, 1.4, 1.2, or 1.0;

the average number of moieties other than hydrogen atoms that are directly bonded to each amino nitrogen atom is not more than, with increasing preference in the order given, 2.5, 2.0, 1.7, 1.4, 1.2, or 1.0;

the average number of carbon atoms per amino nitrogen atom is not less than, with increasing preference in the order given, 1.5, 2.0, 2.5, 2.7, or 2.9 and independently preferably is not more than, with increasing preference in the order given, 10, 8, 6, 5.0, 4.5, 4.0, 3.8, 3.6, 3.4, 3.2, or 3.0;

the average number of hydroxyl moieties per amino nitrogen moiety is at least, with increasing preference in the order given, 0.2, 0.4, 0.6, 0.70, 0.75, 0.80, 0.85, 0.90, 0.95, or 0.98 and independently preferably is not more than, with increasing preference in the order given, 2.5, 2.0, 1.7, 1.4, 1.2, or 1.02;

the percent of total nitrogen atoms that are amino nitrogen atoms is at least, with increasing preference in the order given, 50, 60, 70, 80, 90, 95, or 99%; and the percentage of total oxygen atoms that are part of hydroxyl moieties is at least, with increasing preference in the order given, 50, 60, 70, 80, 90, 95, or 99%.

The single most preferred substance for the base component is 2-aminopropanol-1 (also known as monoisopropanolamine), but other suitable alkanolamines include dimethylethanolamine, diethanolamine, triethanolamine, triisopropanolamine, monoethanolamine, n-butyl diethanolamine, 2-methylaminoethanol, n-butylaminoethanol, diethylaminoethanol, 2-amino-2-methyl-1-propanol, phenyl diethanolamine, diisopropanolamine and the like. Other water-soluble amines such as alkylamines (e.g., triethylamine) and oxazolidines may also be used. Examples of suitable inorganic bases include alkali metal hydroxides, alkali metal carbonates, alkali metal silicates, alkali metal phosphates, and other basic alkali metal salts. In one embodiment of the invention, an alkanolamine is used in combination with an alkali metal silicate such as sodium silicate (preferably, at a silicate concentration in the working solution of from about 0.001 to about 0.1 weight percent).

The ratio by mass of the alkoxylated aromatic alcohol component as described above to the base component as described above in a concentrate or a working composition according to this invention preferably is (where the base is an amine) at least, with increasing preference in the order given, 1.0:1.00, 2.0:1.00, 3.0:1.00, 4.0:1.00, 5.0:1.00, 6.0:1.00, 7.0:1.00, 7.5:1.00, 8.0:1.00, 8.5:1.00 or 8.9:1.00 and independently preferably is not more than, with increasing preference in the order given, 40:1;00, 30:1.00, 25:1.00, 20:1.00, 15:1.00, 13:1.00, 11.0:1.00, 10.5:1.00, 10.0:1.00, 9.8:1.00, 9.6:1.00, 9.4:1.00, 9.2:1.00, or 9.1:1.00. If a relatively strong inorganic base such as an alkali metal hydroxide is used, the preferred alkoxylated aromatic alcohol:base mass ratio will generally be higher.

The various components of the working water-based, paint-removing solutions of the present invention and the concentrations of such components are preferably selected such that the composition has a VOC content (as measured by EPA Method 24) of less than about 0.1 lb./gal, preferably less than about 0.08 lb./gal, and most preferably less than about 0.06 lb./gal.

In a concentrate composition according to the invention, substantial concentrations of water are economically disadvantageous, because they increase the cost of shipping the active ingredients of the concentrate from its point of manufacture to its point of use. However, this disadvantage is purely economic rather than technical and is therefore minimal if the concentration of water in a concentrate is not more than about 10%. On the other hand, water is usually economically necessary in a working composition for actual paint removal according to the invention.

Ordinarily, components other than water, alkoxylated aromatic alcohol and base are not needed in a composition according to the invention and in such instances are preferably omitted, at least for economy. However, an additional surfactant may be needed in some instances to improve initial wetting of the paint to be removed from the substrate surface. The surfactant may be anionic, non-ionic, cationic or amphoteric in character, but preferably is a low foaming surfactant or is used in combination with a defoamer to minimize the amount of foam generated during use. Examples of suitable surfactants include alkylaryl sulfonates such as sodium xylene sulfonate, ethoxylated fatty esters and oils such as MERPOL A (available commercially from E.I. duPont de Nemours & Co.), non-ionic fluorocarbon-based surfactants such as ZONYL FSN (available from E.I. duPont de Nemours & Co.), and non-ionic ethoxylated alkylphenols such as ethoxylated octylphenol. If the water used is very "hard", meaning that it contains substantial concentrations of calcium and/or magnesium cations, a chelating agent for these ions may be needed to prevent unwanted precipitation of scums on the surfaces being cleaned. Suitable chelating agents include water-soluble compounds containing two or more functional groups such as carboxylic acid groups, phosphoryl groups, amine groups, and/or hydroxyl groups which are arranged in suitable positions in the chelating agent molecule such that atoms in two or more functional groups are capable of complexing with a single calcium and/or magnesium cation. Non-limiting examples of suitable chelating agents include EDTA, gluconic acid, citric acid, polyphosphonic acids, and salts thereof. In some instances for removing especially difficult paints, additional solvent may be needed and may be tolerable even if it increases the VOC content of the composition. The auxiliary solvents are preferably water-soluble and may be selected from, for example, polyalkylene glycols, glycols, glycol ethers, glycol esters, glycol oligomers, aliphatic and aromatic alcohols, ethers, ketones, and the like. Corrosion inhibitors may also be present in the paint-removing compositions of the present invention.

Small amounts of alkoxylated aromatic alcohols having a relatively low degree of alkoxylation (e.g., wherein n in the aforedescribed general formula is 1) may also be present in the composition, but it is preferred that such amounts be minimized since such compounds are only sparingly soluble in water and undesirably increase the VOC content of the composition. Also, under at least some conditions, such compounds have surprisingly been found to be less efficient in removing paint than the more highly alkoxylated aromatic alcohols which are the subject of the present invention.

In a process according to the invention, contact between the solution as described above and any paint contaminated surface to be cleaned of paint may be brought about by any convenient method. Immersion and spraying are the most common methods. If the surface to be cleaned has a shape that can be readily and reasonably uniformly contacted by spraying, this method of contact is generally preferred, because the mechanical force of impingement of the sprayed solution aids in efficient paint removal. On the other hand, if the surface to be cleaned has recesses or other shapes that can not readily be contacted by spraying, immersion (flooding) will generally be preferred. The solution may be agitated to help accelerate the rate of paint removal. Both methods can, of course be combined and/or varied in ways apparent to those skilled in the art. The optimum values of active ingredient concentrations and temperature of the working solution depend to some extent on the method of contact and the impingement force (if any) achieved by the contact. General guidelines for spraying are given below, but in any instance, those skilled in the art will be able to determine optimum conditions by minimal experimentation.

In a working paint-removing solution, the concentration of the alkoxylated aromatic alcohol component as described above preferably is at least, with increasing preference in the order given, 0.5, 1.0, 1.3, 1.6, 1.9, 2.1, 2.3, or 2.5% and independently preferably, at least for economy, is not more than, with increasing preference in the order given, 30, 20, 10, 8, 6.0, 5.0, 4.5, or 4.0%. The concentration of the base component (when one or more water-soluble amines are used as the base component) preferably is at least, with increasing preference in the order given, 0.05, 0.1, 0.15, 0.20, 0.25% and independently preferably, at least for economy, is not more than with increasing preference in the order given,. 3, 2, 1, or 0.5%. Higher concentrations within these preferences are preferred for immersion or low force spraying, while lower concentrations are satisfactory technically and are more economical for high force spraying.

Spraying pressure will normally range from 1.3 to 8.0 bars absolute pressure. Near the lower end of this range, the temperature of the paint-removing solution preferably is at least, with increasing preference in the order given, 15, 20, 25, 30, 40, 50, 55, or 60° C. if speed of removal of the paint is important. On the other hand, if the spraying pressure is as much as 2.7 bars, there is no technical advantage to a solution temperature greater than 38° C., because the contact time required is not substantially reduced by higher temperature, while the energy cost of the process is increased.

The compositions of the present invention are also useful for purging paint residues from automated and manual equipment such as paint sprayers and paint dip installations. Typically, the concentrate composition is introduced into a purge tank containing an amount of deionized water effective to dilute the concentrate composition to a concentration of between about 5% and about 15% by volume. The resulting working purge solution is heated to a temperature of from about 38° C. to about 54° C. and then circulated through the equipment to purge any residual paint from the equipment. When actually contacted with the surfaces of the equipment containing the paint residues, the use temperature of the working purge solution is typically about 26° C. to about 32° C. due to heat losses during circulation. To minimize waste, the used purge solution may be reconditioned (by removing paint solids through means such as filtration, settlement, coagulation or the like and/or replenishing one or more components of the purge solution) and recirculated through the equipment. Prior to and/or after circulation of the working purge solution, the equipment may be subjected to other cleaning methods such as purging with water alone or with a gas such as air or nitrogen.

The contact time needed to effect a substantial loosening of the paint from a surface will depend on the nature and thickness of the paint, the relative activity of the components in the composition, the concentrations of such components, and the temperature of the solution, among other factors. With some paints and under some conditions, contact times of a few minutes (e.g., 2-3 minutes) may be sufficient, while with other more difficult to remove paints and with more dilute solutions or lower contact temperatures, appreciably longer contact times ( e.g., up to 1 hour) may be desirable.

The invention and its benefits compared with prior art processes may be further appreciated by consideration of the following working and comparative examples, which are not to be understood as limiting the invention in any way except to whatever extent conditions used in the examples may be found in the appended claims.

Test Substrates

Static Dwell Test Substrates and Method: Thin films of waterborne paint were applied to a glass panel and subsequently baked at 49 to 55° C. for 0.5 to 4 hours. The tested working paint-removing solutions were applied dropwise to the thus prepared test panels, which were then observed to determine the point at which the film softened or bubbled.

Spray Test Method: Thin films of waterborne paint were applied to a glass panel and subsequently baked at 49° C. for 0.5 hours. A conventional spray gun having a 1.07 millimeter fluid tip size was positioned 10 centimeters away from a thus prepared glass panel. Using a fluid pressure as noted below for a particular instance, a solid stream of liquid was directed onto the coated glass panel until a circle of baked paint with a diameter of 10.4 millimeters was completely cleaned from the panel, and the time required was recorded. (In some instances in comparative examples, such cleaning was not achieved within the maximum time allowed; any such instance is noted explicitly.) Temperatures are also specified below for each particular test.

WORKING AND COMPARATIVE EXAMPLE GROUP 1

In this group, the following concentrates were used to make the paint-removing solutions used: Comparative Concentrate C1.1 consisted of 98% of ethylene glycol n-butyl ether and 2% of 2-aminopropanol-1; Working Concentrate C1.2 consisted of 10% of 2-amino-propanol-1 and 90% of Harcross T Det P4™ ethoxylated phenol, which was reported by its supplier to have the following distribution of degrees of ethoxylation, where the number of oxyethylene units per molecule is indicated by n: 3.3% of n=1, 11.6% of n=2, 19.9% of n=3, 22.4% of n=4, 18.6% of n=5, 12.3% of n=6, 6.7% of n=7, 3.1% of n=8, 1.26% of n=9, balance of n≧10; Comparative Concentrate C1.3 consisted of 2-aminopropanol-1 only. These concentrates (when used) were diluted with deionized water to make the working compositions shown in Table 1. All of the test substrates used in this group were prepared with the same paint, Du Pont water-based Galaxy Silver automobile paint, under the conditions noted above for spray testing.

TABLE 1

| Concentrate Used | % by Volume of Concentrate in Working Paint-Removing Solution | Spray Pressure, Bars Absolute | Cleaning Characteristics ||||
|---|---|---|---|---|---|---|
| | | | Average Seconds of Spraying | Number of Tests | % Deviation from the Mean, If More Than One Test | Observation of Thoroughness of Cleaning |
| C1.1 | 10 | 1.3 | 19.5 | 3 | 4.2 | Clean |
| C1.1 | 5 | 1.3 | 19.3 | 1 | | Clean |
| C1.3 | 1 | 1.3 | 31 | 1 | | Film of silver flakes left on panel |
| None | None | 1.3 | 60 | 1 | | 20% Removed, with a film of silver flakes left on panel |
| C1.2 | 5 | 1.3 | 14.1 | 1 | | Clean |
| C1.1 | 10 | 2.0 | 4.1 | 1 | | Clean |
| C1.1 | 5 | 2.0 | 8.0 | 3 | 9.0 | Clean |
| C1.3 | 1 | 2.0 | 11.0 | 1 | | Film of silver flakes left on panel |
| None | None | 2.0 | 60 | 1 | | 60% Removed, with a film of silver flakes left on panel |
| C1.2 | 5 | 2.0 | 5.1 | 1 | | Clean |
| C1.1 | 10 | 2.7 | 4.1 | 2 | 5.5 | Clean |
| C1.1 | 5 | 2.7 | 6.3 | 1 | | Clean |
| C1.3 | 1 | 2.7 | 7.8 | 1 | | Film of silver flakes left on panel |
| None | None | 2.7 | 23 | 1 | | 90% Removed, with a film of silver flakes left on panel |
| C1.2 | 5 | 2.7 | 3.9 | 1 | | Clean |

WORKING AND COMPARATIVE EXAMPLE GROUP 2

In this group, Du Pont Galaxy Silver, BASF Red Primer, and BASF Imola Red Primer automobile paints were tested by spraying. Working Concentrate C2.1 was the same as Working Concentrate C1.2. Working Concentrate C2.2 consisted of 90% of ethoxylated benzyl alcohol (ST-8329 from Clarient Corporation) with an average of 4 oxyethylene units per molecule and 10% of 2-amino-propanol-1. Working Paint-Removing Solutions PRS2.1 and PRS2.2 consisted of 3.0% by volume solutions of C1.1 and C1.2 respectively in deionized water, and Comparative Paint-Removing Solution PRS2.3 was a solution of 0.3% of 2-aminopropahol-1 in deionized water. All of the working solutions were maintained at 49° C. during testing. Spray pressures and test results are shown in Table 2. These results indicate that ethoxylatied benzyl alcohol performs equivalently to or very slightly better than ethoxylated phenol.

TABLE 2

| Paint | Working Paint-Removing Solution | Spray Pressure, Bars Absolute | Spraying Time, Seconds |
|---|---|---|---|
| Du Pont Galaxy Silver | PRS2.2 | 1.3 | 8.6 |
| Du Pont Galaxy Silver | PRS2.1 | 1.3 | 9.3 |
| Du Pont Galaxy Silver | PRS2.2 | 2.7 | 2.5 |
| Du Pont Galaxy Silver | PRS2.1 | 2.7 | 2.6 |
| BASF Red Primer | PRS2.2 | 2.7 | 1.62 |
| BASF Imola Red Primer | PRS2.2 | 2.7 | 1.25 |
| Du Pont Galaxy Silver | PRS2.3 | 2.7 | 3.5* |
| Du Pont Galaxy Silver | PRS2.3 | 1.3 | 15.9* |

*A substantial paint film was left on the area nominally cleaned in these comparative examples.

EXAMPLE AND COMPARATIVE EXAMPLE GROUP 3

In this group, the effectiveness of various alkoxylated aromatic alcohols and comparative alternatives were determined. Unless otherwise noted, all were used to make concentrates with a 9.0:1.00 ratio between the alkoxylated aromatic alcohol component or its alternate and 2-amino-propanol-1, and the concentrates were diluted to 10% by volume with deionized water to make the working or comparative flushing solutions. All of the working flushing solutions according to the invention were made with ethoxylated phenol, but the degree of ethoxylation was varied as shown in Table 3. The alternative substances, not according to the invention, are identified in Table 3 by the following abbreviations: A1=Emphos™ TS-211 ethoxylated phenol phosphate ester; A2=sodium xylene sulfonate; A3=ethylene glycol mono-n-butyl ether; A4=ethylene glycol mono-n-butyl ether, but with a mixing ratio to 2-amino-propanol-1 of 49:1.00 instead of 9.0:1.00; and A5=2-amino-propanol-1. The paints tested, which were all commercially available water-borne automobile paints, are identified in Table 3 by the following abbreviations: P1=PPG Silver; P2=PPG White; P3=PPG Red; P4=PPG Blue; P5=BASF Silver; and P6=Du Pont Galaxy Silver. Three drops of the flushing solution being tested were applied to the test substrates prepared for static dwell testing as described above. Baking condition B1 was 53° C. for 4 hours; baking condition B2 was 49° C. for 0.5 hour. The following abbreviations were used to indicate the effect on the paint film if it did not dissolve: S,ns=Softened, no stripping or dissolution; Nd=no dissolution. The results are shown in Table 3 and indicate that the paint-removing solutions according to the invention were more effective overall than any of the comparative paint-removing solutions tested and have lower VOC than any of the comparative paint-removing solutions A3 through A5 that have reasonably close stripping ability for some of the paints tested. The results also indicate that the paint removing performance of solutions containing ethoxylated phenol with an average of 4 oxyethylene moieties per molecule. was in most instances equivalent or superior to that of solutions containing ethoxylated phenol with an average of only 1 oxyethylene moiety per molecule. This was surprising since it had been expected that the ability of the alkoxylated phenol to loosen the paint film would decrease as the degree of ethoxylation increased. The use of ethoxylated phenols containing a higher degree of ethoxylation is also advantageous since such materials have greater water solubility and lower VOC content.

TABLE 3

| Paint and Baking Conditions | Time in Seconds to Bubble, Significantly Soften, or Dissolve, with: | | | | | | | | |
|---|---|---|---|---|---|---|---|---|---|
| | Ethoxylated Aromatic Alcohol, Average Oxyethylene Moieties per Molecule | | | | Alternative to Ethoxylated Aromatic Alcohol | | | | |
| | 1 | 4 | 6 | 9 | A1 | A2 | A3 | A4 | A5 |
| P1 B1 | 107 | 24 | 28 | 34 | 120 S, ns | 120 S, ns | 35 | 120 S, ns | 41 |
| P2 B1 | 21 | 14.6 | 18.9 | 17.2 | 120 S, ns | 120 S, ns | 13 | 120 | 14.6 |
| P3 B1 | 26 | 32 | 40 | 41 | 120 S, ns | 120 S, ns | 38 | 120 | 40 |
| P4 B1 | No test | 14.6 | 16.7 | 17.4 | 120 S, ns | 120 S, ns | No test | No test | 21 |
| P5 B2 | 29 | 15 | 22 | 29 | 120 S, ns | 120 S, ns | 24 | 24 | 24 Nd |
| P1 B2 | 15 | 12 | 16.5 | 29 | 20 Nd | 24 Nd | 24 | 24 | 24 Nd |
| P6 B2 | 22 | 16 | 26 | 37 | 120 S, ns | 120 S, ns | 10 | 21 | 120 S, ns |

EXAMPLE AND COMPARATIVE EXAMPLE GROUP 4

In this group, a variety of ethoxylated phenols and other materials were investigated for paint removal by spraying, with the paint-removing solution at normal room temperature (about 22° C.). The paint used was Du Pont Galaxy Silver, which had been baked at 49° C. for 0.5 hour before being tested. Spray pressure was also varied. Each tested material was mixed in a ratio of 9.0:1.00 with 2-amino-propanol-1 to form a concentrate, except that for A11, the ratio was 49:1.00. Working paint-removing solutions were made by diluting a concentrate with deionized water to a concentration of 5% by volume of the concentrate in the working paint-removing solution. The following alternatives for alkoxylated aromatic alcohols in accordance with the invention were used, with short identifiers used in Table 4: A6=Triton™ X-45 ethoxylated octyl phenol surfactant; A7=Tergitol™ NP-9 ethoxylated nonyl phenol surfactant; A8=Neodol™ R1-5 ethoxylated alcohol surfactant; A9=Ethomeen™ C25 ethoxylated amine surfactant; A10=Merpol™ A ethoxylated phosphate surfactant; and A11=Ethylene glycol mono-n-butyl ether. Additional specific conditions and results are shown in Table 4. Again, there was general superiority of the examples according to the invention over the comparative examples in cleaning effectiveness, reduced VOC content, or both.

TABLE 4

| Spray Pressure, Bars | Time in Seconds to Clear (Unless Otherwise Noted)* a Circle with a Diameter of 10.4 Millimeters with Flushing Solution Containing: | | | | | | | | |
|---|---|---|---|---|---|---|---|---|---|
| | Alkoxylated Aromatic Alcohol, Average Oxyethylene Moieties per Molecule | | | Alternative to Alkoxylated Aromatic Alcohol | | | | | |
| Absolute | 4 | 6 | 9 | A6 | A7 | A8 | A9 | A10 | A11 |
| 1.30 | 26 | 40 | 40 | 40 Nec | 40 Nec | 40 Nec | 40 Nec | 40 30% | 25 |
| 2.7 | 6 | 13 | 20 | 40 50% | 40 40% | 40 10% | 25 | 40 30% | 5.6 |

*A percentage after the number of seconds indicates the approximate % of the surface that was actually cleaned when this was not all of the surface;
"Nec" means "No effective cleaning."

EXAMPLE AND COMPARATIVE EXAMPLE GROUP 5

In this group the concentration and spray pressure were the primary independent variables. All of the examples according to the invention used a concentrate that consisted of 90% of Harcross T-Det P-4™ ethoxylated phenol and 10% of 2-aminopropanol-1. The nature of the working solution in the comparative examples and other details and results are given in Table 5 below. The test panels were prepared in the same manner as for Group 4 and with the same paint, and the paint removing solutions were maintained at 17° C. during the spraying. At the same concentration, a paint-removing solution according to the invention was superior to an example of current commercially preferred paint-removing solutions for this application.

TABLE 5

| Concentrate Used | % by Volume of Concentrate in Working Flushing Solution | Spray Pressure, Bars Absolute | Cleaning Characteristics | | | |
|---|---|---|---|---|---|---|
| | | | Average Seconds of Spraying | Number of Tests | % Deviation from the Mean, If More Than One Test | Observation of Thoroughness of Cleaning |
| According to the Invention | 5.0 | 1.3 | 21 | 3 | 2.3 | Completely clean |
| | 5.0 | 2.7 | 5.1 | 1 | | Completely clean |
| | 4.0 | 1.3 | 25 | 2 | 4.0 | Completely clean |
| | 4.0 | 2.7 | 5.4 | 1 | | Completely clean |
| | 3.0 | 1.3 | 37 | 2 | 1.9 | Completely clean |
| | 3.0 | 2.7 | 6.7 | 2 | 3.0 | Completely clean |
| | 2.0 | 1.3 | 50 | 1 | | Completely clean |
| | 2.0 | 2.7 | 8.7 | 2 | 3.1 | Completely clean |
| | 1.3 | 1.3 | 58 | 1 | | Completely clean |
| | 1.3 | 2.7 | 14 | 1 | | Completely clean |
| None | None | 1.3 | 120 | 1 | | No observable cleaning effect |
| | None | 2.7 | 120 | 1 | | No observable cleaning effect |
| 2-Amino-propanol-1 | 0.50 | 1.3 | 120 | 1 | | No observable cleaning effect |
| | 1.33 | 2.7 | 26 | 1 | | Some of the paint was removed, but at least a thin layer was left over the entire sprayed area |
| 98% of ethylene glycol mono-n-butyl ether + 2% of 2-amino-propanol-1 | 10 | 1.3 | 25 | 2 | 2.9 | Completely clean |
| | 10 | 2.7 | 4.9 | 2 | 5.2 | Completely clean |
| | 5.0 | 1.3 | 28 | 1 | | Completely clean |
| | 5.0 | 2.7 | 8.2 | 1 | | Completely clean |
| | 4.0 | 1.3 | 32 | 1 | | Some of the paint was removed, but at least a thin layer was left over the entire sprayed area |
| | 4.0 | 2.7 | 13.4 | 1 | | Some of the paint was removed, but at least a thin layer was left over the entire sprayed area |
| | 3.0 | 1.3 | 40 | 1 | | Only 30% of the paint was removed, and at least a thin layer was left over the entire sprayed area |
| | 3.0 | 2.7 | 20 | 1 | | Some of the paint was removed, but at least a thin layer was left over the entire sprayed area |
| | 2.0 | 1.3 | 40 | 1 | | No observable cleaning effect |
| | 2.0 | 2.7 | 34 | 1 | | Some of the paint was removed, but at least a thin layer was left over the entire sprayed area |

What is claimed is:

1. A process of removing paint from a non-water-soluble surface comprising contacting said paint on said surface with a composition comprised of water and a water-soluble alkoxylated aromatic alcohol containing at least two oxyalkylene moieties and an aromatic ring moiety which does not bear any alkyl substituent having more than 4 carbon atoms; and a water-soluble base comprising an alkali metal silicate in an amount of about 0.001 to about 0.1 weight percent of the composition.

2. The process of claim 1 wherein the composition is additionally comprised of an alkanolamine.

3. The process of claim 2 wherein the alkanolamine is selected from the group consisting of monoisopropanolamine, dimethylethanolamine, diethanolamine, triethanolamine, triisopropanolamine, monoethanolamine, n-butyl diethanolamine, 2-methylaminoethanol, n-butylaminoethanol, diethylaminoethanol, 2-amino-2-methyl-1-propanol, phenyl diethanolamine. and diisopropanolamine.

4. The process of claim 1 wherein said water-soluble alkoxylated aromatic alcohol is selected from the group consisting of ethoxylated phenols, ethoxylated benzyl alcohols, and mixtures thereof.

5. The process of claim 1 wherein said water-soluble alkoxylated aromatic alcohol contains from 2 to 10 oxyethylene moieties per molecule.

6. The process of claim 1 wherein said composition comprises from about 0.5 to about 30 weight percent of said water-soluble alkoxylated aromatic alcohol.

7. The process of claim 1 wherein said water-soluble alkoxylated aromatic alcohol is a mixture of compounds corresponding to the general structure

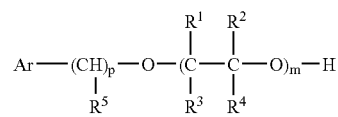

wherein m represents a positive integer which is from about 2 to about 10 on average for the mixture, each of $R^1$- $R^4$, independently for each and independently from one to another of the m instances of each $R^1$-$R^4$ in the same molecule, represents either a covalently bonded hydrogen atom or a covalently bonded methyl moiety, subject to the proviso that at least about 80 number % of the moieties indicated by the symbols $R^1$-$R^4$ in said mixture represent hydrogen atoms, Ar is a substituted or unsubstituted phenyl moiety, subject to the proviso that Ar contains no alkyl substituent containing more than 2 carbon atoms, $R^5$ is selected from hydrogen or methyl, and p is 0 or 1.

8. A process of flushing paint from a non-water-soluble surface comprising contacting said paint on said surface with a composition comprised of:
   a) water;
   b) water-soluble ethoxylated aromatic alcohol selected from the group consisting of ethoxylated phenols, ethoxylated benzyl alcohols, and mixtures thereof, wherein said ethoxylated aromatic alcohol contains an aromatic ring moiety and an average of from about 2 to about 10 oxyethylene moieties per molecule but does not contain any alkyl substituent having more than 2 carbons on said aromatic ring moiety; and
   c) water-soluble alkanolamine in an amount sufficient to provide a pH of 8-14.

9. The process of claim 8 wherein said composition is additionally comprised of an alkali metal silicate.

10. The process of claim 8 wherein said composition is comprised of from about 10 to about 20 weight percent of water-soluble ethoxylated aromatic alcohol and from about 0.1 to about 2 weight percent water-soluble alkanolamine.

11. The process of claim 8 wherein water-soluble ethoxylated aromatic alcohol and water-soluble alkanolamine are present in said composition at a ratio by weight of from about 2:1 to about 30:1.

12. The process of claim 8 wherein said non-water-soluble surface is a surface of a component of paint spraying equipment and said contacting is accomplished by circulating said composition through said component.

13. The process of claim 8 wherein said paint is uncured water-borne paint.

14. A process of flushing uncured water-borne paint from a non-water soluble surface of a component of paint spraying equipment comprising circulating a composition through said component to contact said uncured water-borne paint on said non-water-soluble surface, said composition comprising:
   a) water;
   b) from about 1.0 to about 20 weight percent of water-soluble aromatic alcohol selected from the group consisting of ethoxylated unsubstituted phenols, ethoxylated unsubstituted benzyl alcohols and mixtures thereof, wherein said ethoxylated aromatic alcohol contains an average of from about 3 to about 10 oxyethylene moieties per molecule;
   c) from about 0.1 to about 2 weight percent of water-soluble alkanolamine; wherein (b) and (c) are present in said composition in a weight ratio of from about 4:1 to about 20:1.

15. The process of claim 14 wherein said composition is additionally comprised of at least one additional component selected from the group consisting of surfactants, solvents, chelating agents and corrosion inhibitors.

16. The process of claim 14 wherein said composition is additionally comprised of from about 0.001 to about 0.1 weight percent alkali metal silicate.

17. A process of removing paint from a non-water-soluble surface comprising contacting said paint on said surface with a composition comprised of water and a water-soluble alkoxylated aromatic alcohol containing at least two oxyalkylene moieties and an aromatic ring moiety which does not bear any alkyl substituent having more than 4 carbon atoms, wherein said water-soluble alkoxylated aromatic alcohol is a mixture of compounds corresponding to the general structure

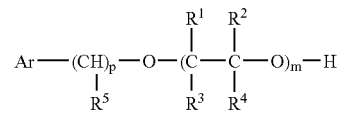

wherein m represents a positive integer which is from about 3 to about 10 on average for the mixture, each of $R^1$-$R^4$, independently for each and independently from one to another of the m instances of each $R^1$-$R^4$ in the same molecule, represents either a covalently bonded hydrogen atom or a covalently bonded methyl moiety, subject to the proviso that at least about 80 number % of the moieties indicated by the symbols $R^1$-$R^4$ in said mixture represent hydrogen atoms, Ar is a substituted or unsubstituted phenyl moiety, subject to the proviso that Ar contains no alkyl substituent containing more than 2 carbon atoms, $R^5$ is selected from hydrogen or methyl, and p is 0 or 1.

18. A process of removing paint from a non-water-soluble surface comprising:
   a) heating to a temperature of from about 38° C. to about 54° C. a composition comprised of water and a water-soluble alkoxylated benzyl alcohol containing at least two oxyalkylene moieties and an aromatic ring moiety which does not bear any alkyl substituent having more than 4 carbon atoms; and
   b) after step a). contacting said paint on said surface with the composition.

* * * * *